(12) United States Patent
Pringle et al.

(10) Patent No.: US 7,133,882 B1
(45) Date of Patent: Nov. 7, 2006

(54) METHOD AND APPARATUS FOR CREATING AND USING A MASTER CATALOG

(75) Inventors: Tamara Pringle, Berkeley, CA (US); Michael Neal, San Francisco, CA (US); Phil Delurgio, Dana Point, CA (US); Suzanne Valentine, Atlanta, GA (US)

(73) Assignee: Demandtec, Inc., San Carlos, CA (US)

( * ) Notice: Subject to any disclaimer, the term of this patent is extended or adjusted under 35 U.S.C. 154(b) by 447 days.

(21) Appl. No.: 10/213,372

(22) Filed: Aug. 5, 2002

(51) Int. Cl.
*G06F 7/00* (2006.01)
*G06F 17/00* (2006.01)

(52) U.S. Cl. .................. 707/104.1; 707/5; 707/10; 707/102

(58) Field of Classification Search ............. 707/104.1; 709/229; 705/26, 14
See application file for complete search history.

(56) References Cited

U.S. PATENT DOCUMENTS

| | | | |
|---|---|---|---|
| 3,017,610 A | 1/1962 | Auerbach et al. | |
| 4,744,026 A | 5/1988 | Vanderbei | |
| 5,063,506 A | 11/1991 | Brockwell et al. | 364/402 |
| 5,117,354 A | 5/1992 | Long et al. | 364/401 |
| 5,212,791 A | 5/1993 | Damian et al. | |
| 5,249,120 A | 9/1993 | Foley | 364/401 |
| 5,299,115 A | 3/1994 | Fields et al. | 364/401 |
| 5,377,095 A | 12/1994 | Maeda et al. | 364/401 |
| 5,459,656 A | 10/1995 | Fields et al. | 364/401 |
| 5,521,813 A | 5/1996 | Fox et al. | |
| 5,615,109 A | 3/1997 | Eder | |
| 5,694,551 A * | 12/1997 | Doyle et al. | 705/26 |
| 5,712,985 A | 1/1998 | Lee et al. | 395/207 |
| 5,732,401 A | 3/1998 | Conway | 705/29 |
| 5,765,143 A | 6/1998 | Sheldon et al. | |
| 5,790,643 A | 8/1998 | Gordon et al. | |
| 5,799,286 A | 8/1998 | Morgan et al. | 705/30 |
| 5,822,736 A | 10/1998 | Hartman et al. | 705/1 |
| 5,873,069 A | 2/1999 | Reuhl et al. | 705/20 |
| 5,878,400 A | 3/1999 | Carter, III | 705/20 |
| 5,918,209 A | 6/1999 | Campbell et al. | 705/5 |
| 5,933,813 A | 8/1999 | Teicher et al. | |
| 5,987,425 A | 11/1999 | Hartman et al. | 705/20 |
| 6,009,407 A | 12/1999 | Garg | 705/10 |
| 6,029,139 A | 2/2000 | Cunningham et al. | 705/10 |
| 6,032,123 A | 2/2000 | Jameson | 705/8 |
| 6,032,125 A | 2/2000 | Ando | 705/10 |
| 6,044,357 A | 3/2000 | Garg | |
| 6,052,686 A | 4/2000 | Fernandez et al. | |

(Continued)

FOREIGN PATENT DOCUMENTS

WO WO 98/53415 11/1998

OTHER PUBLICATIONS

"PCT International Search Report", Application No. PCT/US03/30488, mailed Jan. 28, 2004.

(Continued)

*Primary Examiner*—Uyen Le
*Assistant Examiner*—Susan Y. Chen
(74) *Attorney, Agent, or Firm*—Kang Lim (57) ABSTRACT

A method for updating a master product attribute catalog database for consumer response modeling is provided. Data is received from at least one source of product data. A data integrity check is preformed on the received data. A reconciliation is performed between the received data and the master product attribute catalog. The reconciled received data is placed in a master product attribute catalog.

10 Claims, 5 Drawing Sheets

U.S. PATENT DOCUMENTS

| | | | |
|---|---|---|---|
| 6,078,893 A | 6/2000 | Ouimet et al. ................ 705/10 |
| 6,094,641 A | 7/2000 | Ouimet et al. ................ 705/10 |
| 6,125,355 A | 9/2000 | Bekaert et al. ............... 705/36 |
| 6,134,534 A | 10/2000 | Walker et al. |
| 6,173,345 B1 | 1/2001 | Stevens |
| 6,202,070 B1* | 3/2001 | Nguyen et al. .......... 707/104.1 |
| 6,205,431 B1 | 3/2001 | Willemain et al. ............ 705/10 |
| 6,308,162 B1 | 10/2001 | Ouimet et al. .............. 364/401 |
| 6,341,268 B1 | 1/2002 | Walker et al. |
| 6,341,269 B1 | 1/2002 | Dulaney et al. |
| 6,397,193 B1 | 5/2002 | Walker et al. |
| 6,405,175 B1* | 6/2002 | Ng .............................. 705/14 |
| 6,456,986 B1 | 9/2002 | Boardman et al. |
| 6,546,387 B1* | 4/2003 | Triggs ........................... 707/5 |
| 6,553,352 B1 | 4/2003 | Delurgio et al. |
| 6,684,193 B1 | 1/2004 | Chavez et al. |
| 6,697,824 B1* | 2/2004 | Bowman-Amuah ......... 709/229 |
| 6,725,208 B1 | 4/2004 | Hartman et al. |
| 6,731,998 B1 | 5/2004 | Walser et al. |
| 6,735,572 B1* | 5/2004 | Landesmann ................ 705/14 |
| 6,826,538 B1 | 11/2004 | Kalyan et al. |
| 6,910,017 B1 | 6/2005 | Woo et al. |
| 6,934,931 B1 | 8/2005 | Plumer et al. |
| 6,965,867 B1 | 11/2005 | Jameson |
| 2002/0023001 A1 | 2/2002 | McFarlin et al. |
| 2002/0042739 A1 | 4/2002 | Srinivasan et al. |
| 2002/0107819 A1 | 8/2002 | Ouimet |
| 2002/0116348 A1 | 8/2002 | Phillips et al. |
| 2002/0123930 A1 | 9/2002 | Boyd et al. |
| 2002/0198794 A1 | 12/2002 | Williams et al. |
| 2003/0110072 A1 | 6/2003 | Delurgio et al. |
| 2003/0177103 A1* | 9/2003 | Ivanov et al. ............... 705/400 |

OTHER PUBLICATIONS

Bruce G.S. Hardie et al., "Attribute-based Market Share Models: Methodological Development and Managerial Applications", University of Pennsylvania, Working Paper 98-009, pp. 1-48, 1998.

Rossi, Delorgio, & Kantor, "Making Sense of Scanner Data;" Harvard Business Review, Reprint F00205, 2000.

"Pacificorp IRP: Renewables Costs Must Drop 65% to be Competitive with Gas," dated Dec. 8,1995.

Robert J. Dolan, "How Do You Know When the Price is Right?", Harvard Business Review, Sep.-Oct. 1995, p. 4-11.

"PCT International Search Report", Application No. PCT/US02/14977, mailed May 5, 2003

Dyer, Robert F. et al., "Case Studies in Marketing Decisions Using Export Choice," Decision Support Software, 1988, pp. 2-7, 73-108.

"Merriam Webster's Collegiate Dictionary", 10th edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.

Scherage, Dan, "You Do the Math," Chain Store Age, v76, n7. Jul. 2000, pp. 4.

"Gymboree Enhances Price Management," Retail Systems Alert, vol. 13, No. 6, Jun. 2000, pp. 1.

Binkley, James K.; Connor, John M., "Grocery Market Pricing and the New Competitive Environment." Journal of Retailing, v74, n2, Summer 1998, pp. 10.

"KhiMetrics Help Retailers Increase Margins With Two New Tools for Their Retail Revenue Management Application Suite." PR Newswire, Mar. 1, 2001, pp. 2.

"KhiMetrics and Retek Form Marketing Alliance for Comprehensive Retail Pricing Solution." PR Newswire, Feb. 9, 2001, pp. 2.

Barth, Brad. "ShopKo Holds the Price Line." Daily News Record, p. 10, Oct. 4, 2000.

"Manugistics Agrees to Acquire Talus Solutions." PR Newswire, Sep. 21, 2000, pp. 3.

"Goodyear Implements Trilogy's MultiChannel Pricing Solution as Its Enterprise-Wide E-Pricer Platform." Business Wire, p. 2286, Jun. 27, 2000, pp. 2.

"IMRglobal Signs New Product Implementation Agreement with Retek to Improve Retail Pricing and Markdown Process." Business Wire, p. 1590, Jun. 7, 2000, pp. 2.

"New Tools for Modeling Elasticity, Optimizing Prices and Collecting Live Pricing from the Web to Debut at Retail Systems 2000 in Chicago." Business Wire, p. 1484, Apr. 18, 2000, pp. 2.

Barth, Brad, "Shopko Tests Automated Markdowns", WWD Oct. 4, 2000, pp. 1-3.

Cook, Martie, "Optimizing Space and Sales with Markdown Software", Office.com, May 31, 2000, p. 1.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

Smith et al., "A Discrete Optimization Model for Seasonal Merchandise Planning." Journal of Retailing, vol. 74, No. 2, p. 193(29), Summer 1998, pp. 18.

Flanagan, David, "Javascript: The Definitive Guide, 3rd Edition," published by O'Reilly in Jun. 1998 (ISBN 1-56592-392-8) section 14.8, pp. 3.

Berners-Lee, T., "Hypertext Markup Language 2.0 Working Paper," Nov. 1995 (pp. 1-3).

Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).

Abraham, Magid M. and Leonard M. Lodish, "Promoter: An Automated Promotion Evaluation System," Marketing Science, vol. 6, No. 2, 1987 (p. 101-123).

Little, John D. C., "Brandaid: A Marketing-Mix Model Part 1: Structure," Operations Research, vol. 23, No. 4, Jul.-Aug. 1975 (p. 628-655).

Cerf, Vinton G. and Robert E. Kahn, "A Protocol for Packet Network Interconnection," IEEE Transactions on Communications COM-22, May 1974, (p. 637-648).

Kadiyali et al., "Manufacturer-retailer Channel Interactions and Implications for Channel Power: An Investigation of Pricing in Local Market", Marketing Science, Spring 2000, V. 19, Issue 2, pp. 36.

Andrew B. Gelman et al., "Bayesian Data Analysis", pp. 439-455, Chapman & Hall/CRC, First Edition 1995, Reprinted 2000.

"Report of Novelty Search" by Patentec, dated Feb. 9, 2001, pp. 1.

"Report of Novelty Search" by Patentec, dated Jul. 25, 2001, pp. 1.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", University of Pennsylvania, Working Paper 98-009, pp. 1-48.

Alan Mercer, "Non-linear Price Effects", Journal of the Market Research Society, dated Jul. 1, 1996, p. 227, pp. 8.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28

Robert C. Blattberg et al., "How Promotions Work", Marketing Science, vol. 14, No. 3, Part 2 of 2, 1995, p. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10. Jun. 1983, pp. 96-108.

Eileen Bridges et al., "A High-Tech Product Market Share Model With Customer Expectations" Marketing Science, vol. 14, No. 1, Winter 1995, pp. 61-83.

Richard R. Batsell, et al., "A New Class of Market Share Models", Marketing Science, vol. 4, No. 3, Summer 1985, pp, 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 19932, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994 pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does it Matter How price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

Wiliam R. Dillon et al., "A Segment-level Model of Category Volume and Brand Choice", Marketing Science, vol. 15, No. 1, 1996, pp. 38-59.

Stephen J. Hoch et al., "Determinants of Store-Level Price Elasticity", Journal of Marketing Research, vol. XXXII (Feb. 1995), pp. 17-29.

Magid M. Abraham Et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of marketing Research, vol. XXXII (Nov. 1996), pp. 442-452.

Rossi, Delorgio, & Kantor, "Marketing Sense of Scanner Data;" Harvard Business Review, Reprint F00205.

Bucklin & Gupta, "Brand Choice, Purchase Incidence, and Segmentation: An Integrated Modeling Approach," Journal of Marketing Research, May 1992, pp. 201-215, vol. XXIX.

Smith, Mathur, & Kohn; Bayesiuan Semiparametric Regression: An Exposition and Application to Print Advertising;: Jan. 3, 1997; Australian Graduate School of Management., University of New South Wales, Sydnet 2025, Australia.

Blattberg and Deighton, "Manage Marketing by the Customer Equity," Harvard Business Review, Jul.-Aug. 1996, pp. 136-144.

Christen, Gupta, Porter, Staelin & Wittink; "Using Market-Level Data to Understand the Effectiveness of Promotional Activities;" Dec. 22, 1995.

Ross Link, "Are Aggregate Scanner Data Models Biased?," Journal of Advertising Research, Sep./Oct. 1995, pp. RC8-RC12. ARF.

Russell et al., "Understanding Brand Completion Using Micro and Macro Scanner Data," Journal of Marketing Research, vol. XXXI (May 1994), pp. 289-303.

John Philip Jones, "The Double Jeopardy of Sales Promotions," Harvard Business Review, Sep.-Oct. 1999, pp. 145-152.

Buzzell, Quelch & Salmon; "The Costly Bargain of Trade Promotion;" Harvard Business Review, Reprint 90201, Mar.-Apr. 1990, pp. 1-9.

Curry, Divakar, Mathur & Whiteman; "Bvar as a Category Management Tool: An Illustration and Comparison with Alternative Techniques;" Journal of Forecasting, vol. 14, Iss. No. 3 (1995), pp. 181-199.

Montgomery: "The Impact of Micro-Marketing on Pricing Strategies", 1994 The University of Chicago vol. 55/12-A of Dissertation of Abstracts International, p. 3922 (Abstract Only) p. 1.

Busch: "Cost Modeling as a Technical Management Tool", Research-Technology Management, Nov./Dec. 1994, vol. 37, No. 6, pp. 50-56.

"Pacificorp IRP: Renewables Costs Must Drop 65% to be Competitive with Gas" p. 1.

"PCT International Search Report", Application No. PCT/US02/36710, mailed Jul. 21, 2003.

Yoeman, John Cornelius Jr., "The Optimal Offering Price for Underwritten Securities", 1993, vol. 55/01.—A of Dissertation Abstracts International, p. 4743 (Abstract Only).

Hillier, Frederick S., et al., "Introduction to Operations Research", McGraw-Hill, Inc., 1995, Sixth Edition, pp. 1-14.

Alan L. Montgomery and Peter R. Rossi, "Estimating Price Elasticities with Theory-Based Priors," Journal of Marketing Research vol. XXXVI, Nov. 1999 (pp. 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).

Alan L. Montgomery, "Creating Micro-Marketing Pricing Strategies Using Supermarket Scanner Data," Marketing Science, vol. 16, No. 4, 1997 (pp. 315-337).

Robert C. Blattberg and Edward I. George, "Shrinkage Estimation of Price and Promotionaol Elasticities: Seemingly Unrelated Equations," Journal of the American Statistical Association, vol. 86, No. 414, Jun. 1991 (pp. 304-315).

Arnold Zellner, "On Assessing Prior Distribution sand Bayesian Regression Analysis With G-Prior Distributions," Elsevier Science Publishers, 1986 (pp. 233-243).

A.F.M. Smith, "A General Bayesian Linear Model," University of Oxford, Apr. 1972.

D.V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Wisconsin, Jun. 1962.

* cited by examiner

METHOD AND APPARATUS FOR CREATING AND USING A MASTER CATALOG

BACKGROUND OF THE INVENTION

The present invention relates to providing a pricing for a plurality of products.

In businesses, prices of various products must be set. Such prices may be set with the goal of maximizing profit or demand or for a variety of other objectives. It is desirable to provide computer generated pricing to help optimize profit or demand. During a price optimization, the prices of hundreds of items may be set for hundreds of stores. Such optimizations require large amounts of data to be provided. Sometimes such data has errors. In addition, sometimes data is missing. It is desirable to be able to automatically have data errors corrected and have missing data provided or estimated.

SUMMARY OF THE INVENTION

To achieve the foregoing and in accordance with the purpose of the present invention, a method for updating a master product attribute catalog database for consumer response modeling is provided. Data is received from at least one source of product data. A data integrity check is preformed on the received data. A reconciliation is performed between the received data and the master product attribute catalog. The reconciled received data is placed in a master product attribute catalog.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
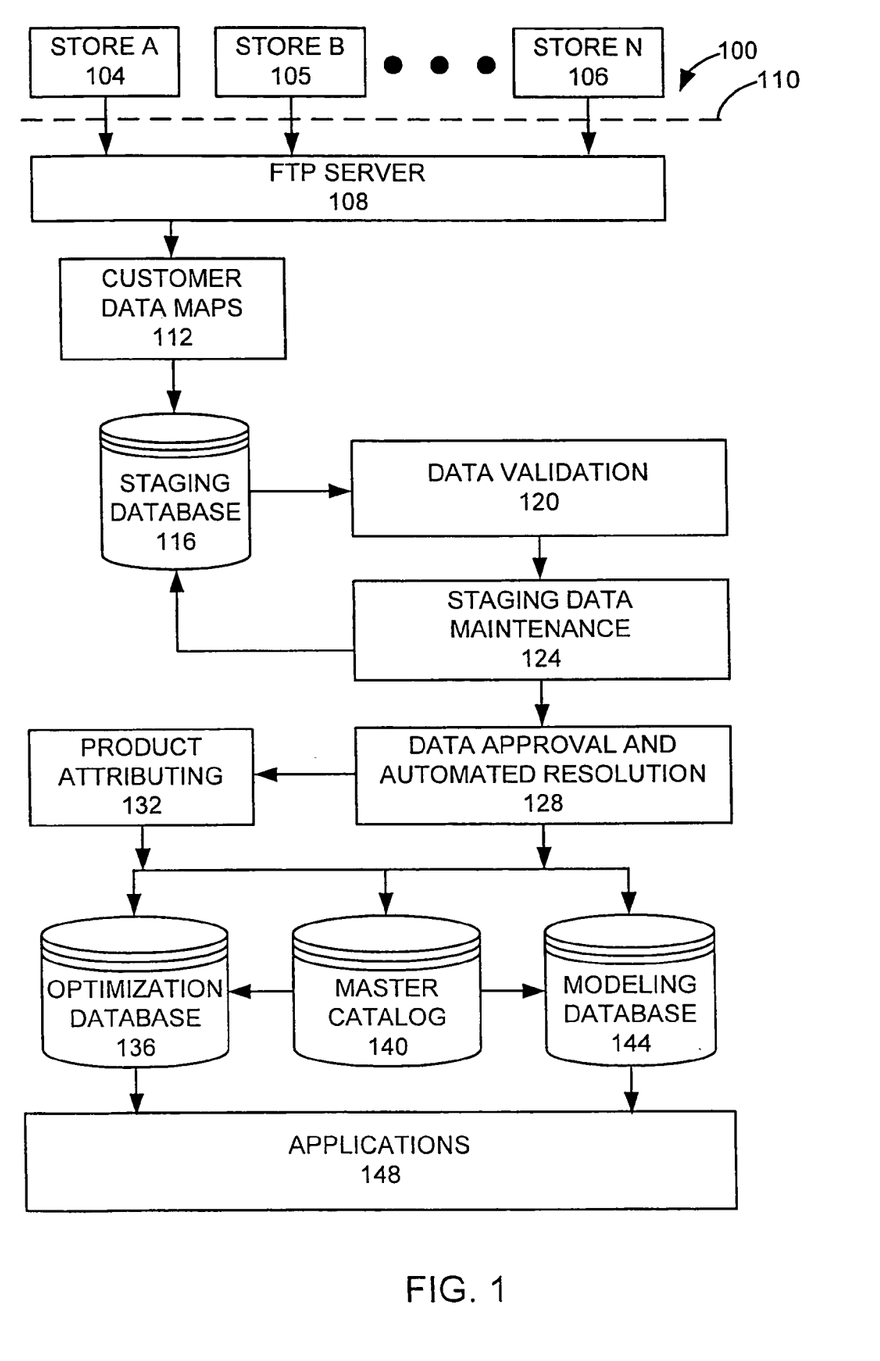
FIG. 1 is a schematic view of an integration, tools, and modeling system.
Figure 2:
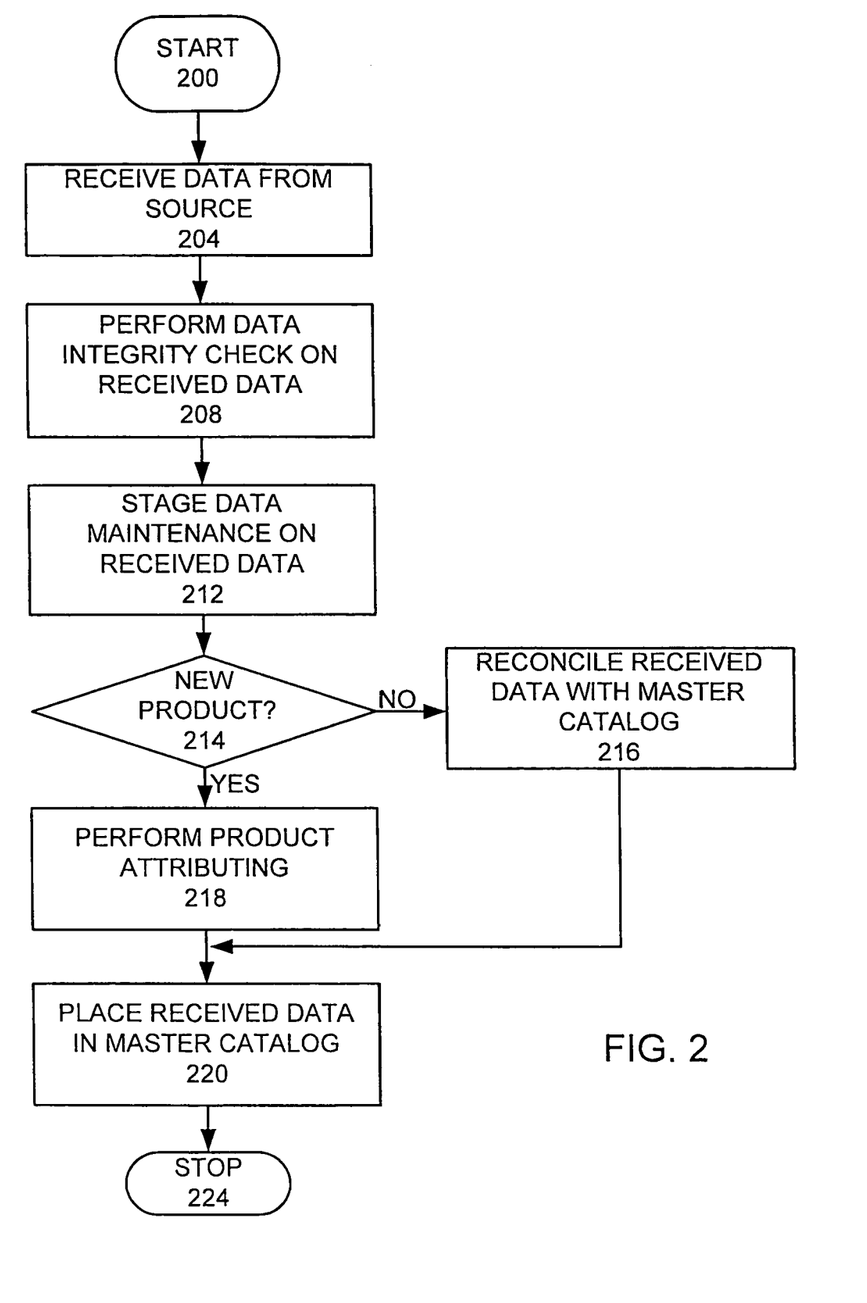
FIG. 2 is a high level flow chart of a process used in an embodiment of the invention.

To facilitate discussion, FIG. 1 is a schematic view of an integration, tools, and modeling system 100 that may used to implement an embodiment of the invention. FIG. 2 is a high level flow chart of a process that may use the system 100. Data is received from at least one data source (step 204) The at least one data source may be a plurality of stores 104–106 that provide data to a fileserver 108 of the system 100, which receives the data. The data may include product data, store data, competitive data, cost data, promotion data, and point of sale data. The point of sale data may include volume of sales and sales price by UPC. Preferably 104 weeks of point of sale data is used to create a sales model. Then point of sale data may be provided on a weekly basis. Product data may include a customer ID number, brand name, case size, line price, and other attributes. Such data may be provided on a weekly basis. Store data may include store description, store location, store number, store address, and store zone. This data may be received on a weekly basis. Cost data may be derived from point of sale data or may be provided. Cost data may be provided for individual products or a large group of products. The competitive data may consist of price information for given product and competitor location. This information may be received periodically. This information may be optional. Promotion data may provide promotion percentage, type, and timeframe for a given product. This information may be provided periodically and may be optional. Cost data may be cost information for a given distribution facility. Such cost data may be optional, with default costs used for missing cost data. The stores 104–106 may be different store chains. Preferably, the fileserver 108 is an FTP server that allows the data to be sent from the stores to the fileserver over the Internet using the Internet file transfer protocol (FTP). A firewall 110 may be used to protect the fileserver from unauthorized uses over the Internet. In another embodiment, a secure file transfer protocol may be used instead.

Customer specific data maps 112 may be used to map data from each store into a staging database 116. The data maps 112 allow a customer to submit data in the customers own format and yet provide data in database that is in the same format as other data from other customers.

A data integrity check is then performed on the received data (step 208) by the data validation application 120. The data integrity check may perform a plurality of data specific data validation tests, which are data type specific. Such tests may check for missing data, data that is outside of an expected value range, and other data errors, which may be easily checked and possibly be corrected. In addition, during this step, a check is may be made of whether any of the products is a new product that has not yet been entered into the master catalog. The detection of a new product may be done by comparing the UPC of each product with UPCs in the master catalog. If a matching UPC is not found in the master catalog, the product may be designated as a new product.

The staging data maintenance application 124 provides a user interface to allow a user to provide data maintenance on the received data (step 212). For example, the data validation application 120 may determine that a brand name is not specified for a product. The staging data maintenance 124 application would provide an interface to the user to indicate that a brand name is missing. The user would use the user interface of the staging data maintenance 124 application to provide a brand name. The staging editor may have an exception summary module, an exception detail module, and a data editor. The exception summary module lists all of the tests for a specific data type and the resulting number of records in violation. The exception detail module provides details of why a specific record failed a validation test. The data editor module allows the viewing of staging table records in context. In the preferred embodiment the staging editor would be able to sort data records, filter data records, page data results, update data records, discard updates, and save updates.

A check is made of whether a product is a new product, (i.e. if the product UPC is not in the master catalog) (step 214) by the data approval and automated resolution application 128. If the product is not new then the product attributes in the received data are reconciled with the data in the master catalog 140 (step 216). For received data for a product that is not a new product, but instead already exists in the master catalog, the product attributing application reconciles the received data with data in the master catalog 140. This may be done by first determining if there is a data conflict between the received data and the master catalog 140. For example, if UPC 123 exists with a brand value of "Tide" in the master catalog, but the received data lists the UPC 123 brand value as "Cheer" a validation error is created. The received data for UPC 123 may be changed so that the brand value is changed to "Tide". The updated data may be used to update the master catalog 140 and the modeling database 144. The original received data may also be stored to enable a voting process. During reconciliation or on a periodic basis, the data in the master catalog is used to provide a voting type of process. For example, since the received data described above had a brand value of "Cheer" and the master catalog 140 had a brand value of "Tide" for UPC 123, a "no" vote is registered. The application may change or reevaluate the brand value of UPC 123 for the master catalog 140, if enough "no" votes are recorded. In one embodiment, if more "Cheer" brand values are recorded than "Tide" brand values for UPC 123, then the brand value in the master catalog 140 for UPC 123 is changed from "Tide" to "Cheer". Other types of voting using other thresholds may be used. In this embodiment the data approval and automated resolution application also places the reconciled received data into the optimization database 136 and the modeling database 144 (step 220). The automated resolution part may also prevent duplicate records and provide for the aggregation of multiple records.

If a new product was detected by the data validation application 120, a product attributing process is performed by the product attributing application 132 (step 218.). The product attributing application 132 allows the assigning of attributes such as a demand group, designation, brand, form, and size, flavor, . . . may be assigned to a product that is newly entered into the master catalog. Such attributes may be model specific attributes or more general attributes. The new product and attributes are added to the master catalog 140 by the attributing application 132 (step 220). A new record may be created for the new product.

The master catalog 140 is a product attribute database for all products stored by a product attribute such as a universal product code (UPC). It is desirable that the master catalog 140 is retailer independent. Therefore a universal attribute that is retailer independent, such as the UPC, is desirable for classification in the master catalog 140. The master catalog 140 may contain other product attributes such as description, line, and brand, demand group classification, size group, and other attributes related to how a consumer purchases a product such as flavor or related to costs of the product such as case size. To provide retailer independence, it is also desirable that some of the data on products in the master catalog 140 are provided by more than one retailer. By allowing the master catalog to be retailer, independent data cleansing and attributing is leveraged across customers, which ensures that a product is treated consistently irrespective of the customer through the modeling and optimization process.

The modeling database 144 is a customer specific database of customer specific data, such as point of sale information, store attributes, and products for each customer. The point of sale information may include volume for each product at each store during each time period for a particular customer. In a preferred embodiment the primary inputs to the modeling database are product, location, and point of sale data.

The optimization database 136 may also be a customer specific database, which may include customer specific Activity Based Cost (ABC) data, product data, store location information, competitive price information, and results of a modeling process.

Figure 3:
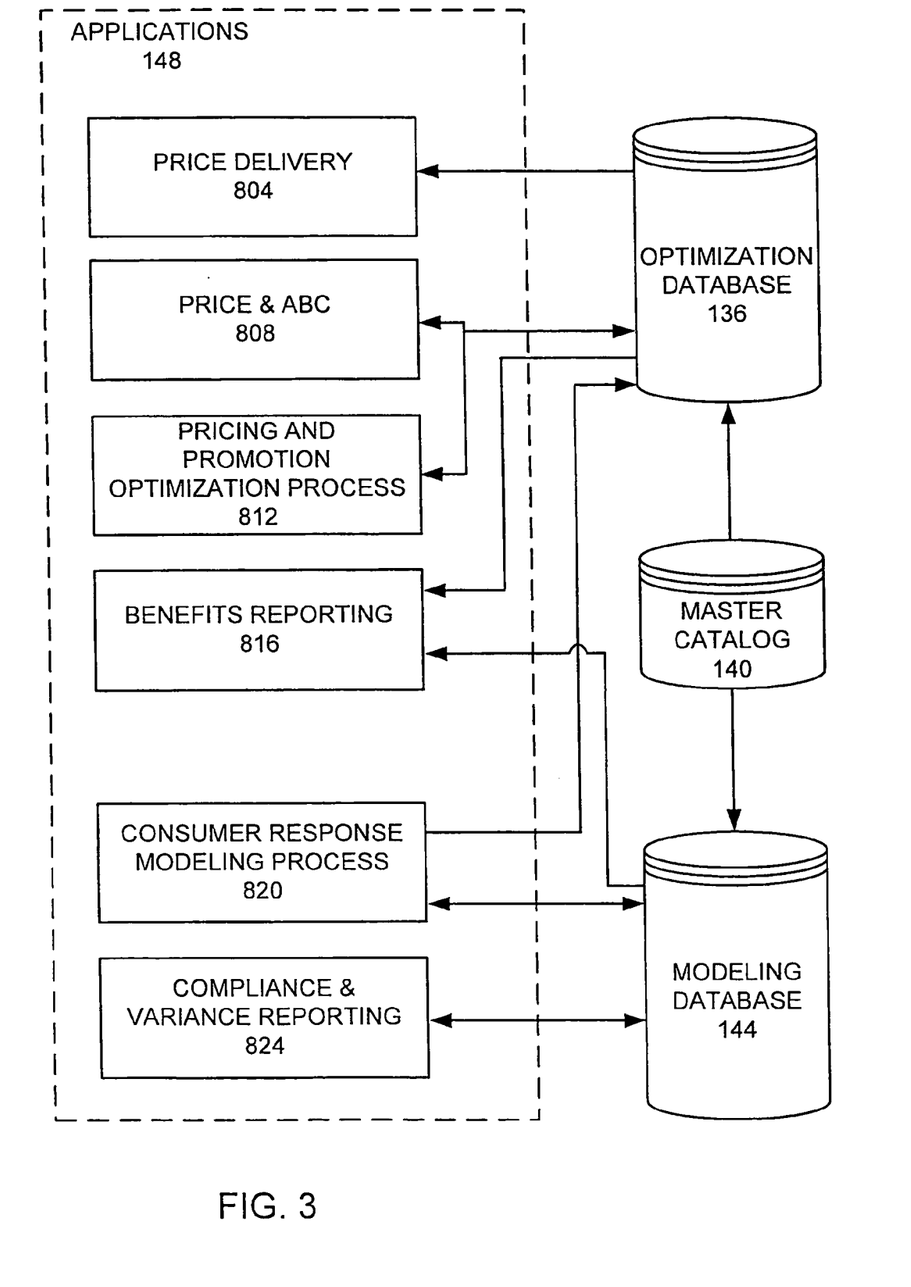
FIG. 3 is a more detailed schematic view of databases and applications illustrated in FIG. 1.

FIG. 3 is a more detailed view of the applications 148 and how they are connected to the optimization database 136, the modeling database 144, and the master catalog in a preferred embodiment of the invention. In this embodiment, the applications 148 comprises a price delivery application 804, a price and activity based cost (ABC) application 808, a pricing and promotion optimization processing application 812, a benefits reporting application 816, a consumer response modeling process application 820, and an price and promotion compliance and variance reporting application 824.

Once all of the data required for modeling is provided to the modeling database 144, the consumer response modeling process application 820 may process the data to provide demand model. In this embodiment a modeling program by SAS, which is produced by SAS Institute of Cary, N.C. may be used to provide the demand model. The primary inputs are product, location, and point of sale data. The product attributes are also used in the model. Modeling is carried out on a per category basis for each customer (it estimates econometric coefficients corresponding to different marketing levers such as price, promotion, . . . , and environmental variables such as seasonality. The model may be refreshed every 3 to 12 months or continuously whenever new point of sale data becomes available. Other modeling programs may be used. Model coefficients may be provided to the optimization database 136 by the modeling process application 820. In the preferred embodiment, Bayesian statistics is used to estimate the model coefficients. The parameters generated by the modeling process 820 are provided to the optimization database 136. In the preferred embodiment, some of the model specific attributes such as demand group may be used in the model to predict demand given price combinations and other variables.

The price and ABC application 808 may use the modeling parameters in the optimization database 136 provided by the modeling process application 820 to provide an optimization according to a client's input. The price and promotion optimization processing 808 may use the modeling parameters in the optimizing database to provide optimized price and promotion decisions, which may maximize profit or sales or some other goal. GAMS "General Algebraic Modeling System" is a commercial software for math programming by GAMS Development Corporation of Washington D.C., which may be used to provide such an optimization. The price delivery application 804 may be used to deliver the optimized pricing to the stores 104, 105, 106.

The benefits reporting application 816 determines and reports to the clients the benefits derived from the optimized prices. The compliance and variance reporting 824 may be used to identify how compliant the stores are to the optimized pricing and promotion recommendations and how close the model fits to the actual store's sales.

In other embodiments of the invention, other application combinations may be provided that use the data in the databases, such as assortment applications, placement applications, and markdown pricing applications. An assortment application may be used to determine what assortment of products should be carried. In addition, the invention may not have all of the applications described above in the preferred embodiment.

Although the preferred embodiment links products according to demand groups other methods of linking products for a linked product attribute may be used in other embodiments of the invention.

Figure 4A:
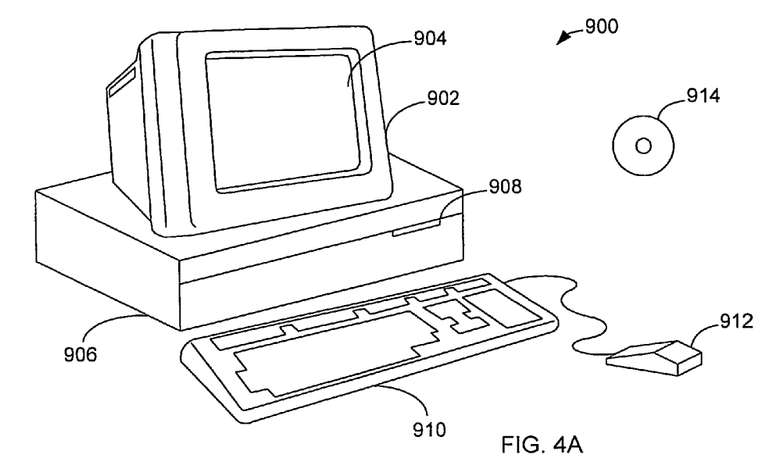
FIGS. 4A and 4B illustrate a computer system, which forms part of a network and is suitable for implementing embodiments of the present invention.
Figure 4B:
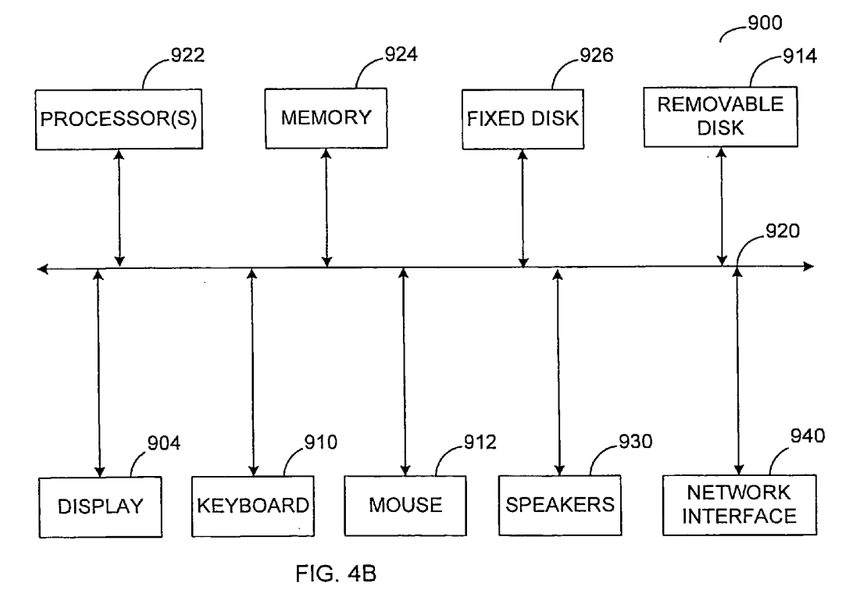

FIGS. 4A and 4B illustrate a computer system 900, which is suitable for implementing embodiments of the present invention. FIG. 4A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912, and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 5:
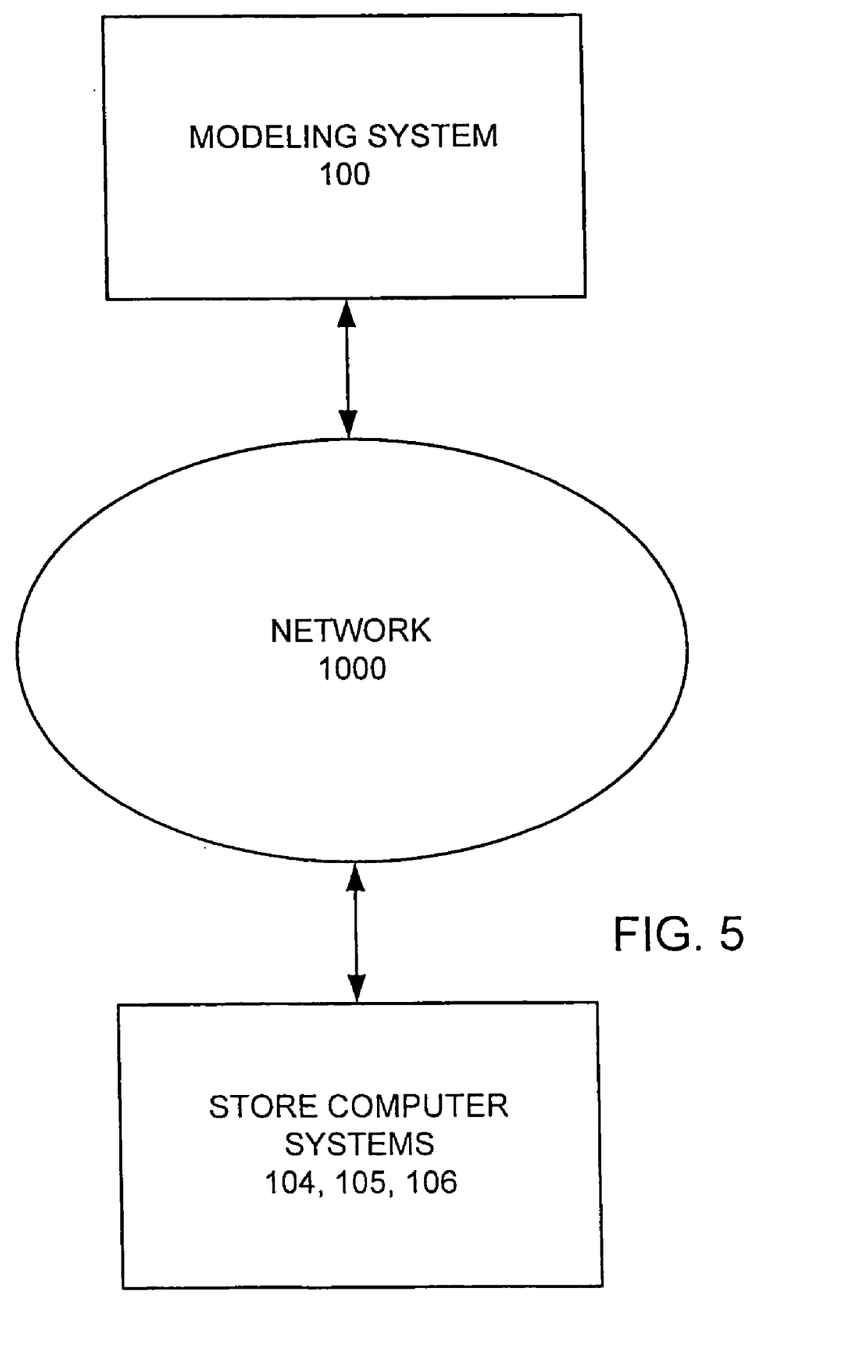
FIG. 5 is a schematic illustration of an embodiment of the invention that functions over a network.

FIG. 5 is a schematic illustration of an embodiment of the invention that functions over a computer network 1000. The network 1000 may be a local area network (LAN) or a wide area network (WAN). An example of a LAN is a private network used by a mid-sized company with a building complex. Publicly accessible WANs include the Internet, cellular telephone network, satellite systems, and plain-old-telephone systems (POTS). Examples of private WANs include those used by multi-national corporations for their internal information system needs. The network 1000 may also be a combination of private and/or public LANs and/or WANs. In such an embodiment, the modeling system 100 is connected to the network 1000. Computer systems used by the stores 104–106 are also connected to the network 1000. The computer systems for the stores 104–106 are able to bi-directionally communicate with the price modeling system 100 over the network 1000.

Computer readable media may be used by the computer system 900 to communicate over the network 800 to collect store specific information to generate a consumer response model, and to receive feedback to an indicator or to obtain constraints. Computer readable media may be used by the computer system 900 to perform an optimization.

The master catalog with data for products, where at least one product has data from a plurality of sources of product data, provides the benefit of being able to allow the correction of inaccurate data from a source of product data. As a result, it has been found that the data quality in the resulting master catalog is improved over other data sources. In addition, a modeling process may require product attributes specific to the modeling process. If a new source of product data, such as a new store chain is added, existing data in the master catalog may be used to provide product attributes for products sold by the new source for product data. Product data from the new source for product data may be added to the master catalog, using the voting to correct any errors in the product data from the new source for product data or any errors in the master catalog data.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer-implemented method for updating a master product attribute catalog database for consumer response modeling, comprising:

receiving data in a customer specific data format from at least one source of product data, wherein the received data includes product data, store data, cost data promotion data and point of sale data;

converting the received data, using a customer specific data map, from the customer specific data format to a common data format useful for updating a master product attribute catalog;

storing the converted received data in a staging database;

performing a data integrity check on the converted received data;

determining if the converted received data exists in the master product attribute catalog, and if the converted received data exists in the master product attribute catalog:

then performing a reconciliation between the converted received data and the master product attribute catalog to determine whether there is a conflict between the converted received data and the master product attribute catalog, and if there is a conflict then performing a vote of the converted received data, and whenever the vote exceeds a threshold then updating the product data in the master product attribute catalog;

else if the converted received data does not exists in the master product attribute catalog, then creating a new record of the converted received data in the master product attribute catalog, and updating the master product attribute catalog by adding the product data to the new record;

adding the converted received data to a modeling database;

adding the product data from the master product attribute catalog to the modeling database;

creating a consumer response model from the converted received data and the product data in the modeling database, wherein the consumer response model includes a sales model;

adding the converted received data to an optimization database;

adding the product data from the master product attribute catalog to the optimization database; and adding parameters including model coefficients of the consumer response model to the optimization database, and wherein the model coefficients are estimated using Bayesian statistics.

2. The computer-implemented method, as recited in claim 1, wherein the at least one source is at least three sources of product data.

3. The computer-implemented method, as recited in claim 1 wherein updating the product data in the master product attribute catalog includes updating a brand value.

4. The computer-implemented method, as recited in claim 1, further comprising generating an optimization from the converted received data, the product data and the parameters in the optimization database, and wherein the optimization includes optimized price and optimized promotion recommendations.

5. The computer-implemented method, as recited in claim 4, wherein the point of sale data includes volume of sales data and sale price data.

6. The computer-implemented method, as recited in claim 5, wherein a benefits reporting application determines and reports benefits derived from the optimization, reports compliance of retailers to the optimized price and the optimized promotion recommendations, and reports any variance between the model sales and the volume of sales data.

7. The computer-implemented method, as recited in claim 1, further comprising staging data maintenance on the received data.

8. The computer-implemented method, as recited in claim 1, wherein the modeling database includes a customer specific database of customer specific data.

9. The computer-implemented method, as recited in claim 1, wherein the product data storage in the master attribute catalog is by a retailer independent product attribute.

10. The computer-implemented method, as recited in claim 1, further comprising that the data source provide the received data to a fileserver for data reception.

* * * * *